United States Patent
Häffner et al.

(10) Patent No.: US 6,849,698 B2
(45) Date of Patent: Feb. 1, 2005

(54) METHOD FOR HIGH PRESSURE POLYMERIZATION OF ETHYLENE IN THE PRESENCE OF SUPERCRITICAL WATER

(75) Inventors: Eckhard Häffner, Clausthal-Zellerfeld (DE); Dieter Littmann, Mücke (DE); Frank-Olaf Mähling, Mannheim (DE); Gernot Köhler, Meckenheim (DE)

(73) Assignee: Basell Polyolefine GmbH, Wesseling (DE)

( * ) Notice: Subject to any disclaimer, the term of this patent is extended or adjusted under 35 U.S.C. 154(b) by 50 days.

(21) Appl. No.: 10/296,440

(22) PCT Filed: May 25, 2001

(86) PCT No.: PCT/EP01/05996

§ 371 (c)(1),
(2), (4) Date: Nov. 25, 2002

(87) PCT Pub. No.: WO01/93225

PCT Pub. Date: Dec. 6, 2001

(65) Prior Publication Data

US 2003/0162913 A1 Aug. 28, 2003

(30) Foreign Application Priority Data

May 30, 2000 (DE) .......................................... 100 26 581

(51) Int. Cl.[7] .................................................. C08F 2/06
(52) U.S. Cl. ........................... 526/61; 526/64; 526/227; 526/348; 526/352
(58) Field of Search ........................... 526/61, 64, 227, 526/348, 352

(56) References Cited

U.S. PATENT DOCUMENTS

| 2,419,008 | A | * | 4/1947 | Coffman et al. ............ 526/227 |
| 4,093,795 | A |   | 6/1978 | Buechner et al. ........... 528/481 |
| 5,100,978 | A |   | 3/1992 | Hasenbein et al. .......... 526/86 |

FOREIGN PATENT DOCUMENTS

| DD | DD 140 890 | 4/1980 | |
| DE | 2524474 | 12/1976 | |
| DE | 4102808 | 8/1992 | |
| EP | B-271 738 | 6/1988 | |
| EP | 449092 | 10/1991 | |
| EP | 394794 B1 * | 7/1994 | ............ C08F/2/00 |
| EP | 394794 | 7/1994 | |
| EP | 567818 | 7/1997 | |
| JP | A-58-108 216 | 6/1983 | |

OTHER PUBLICATIONS

European Polymer Journal (1981), vol. 17 (2), pp. 115–120 (Constantin et al.).

Sales–Specification "Vinyl acetate" of Celanese Chemicals of Apr. 1998.

"Abnahmepruefungszeugnis B" of Celanese GmbH of Aug. 26, 1999.

Ullmanns Enc. der Tech. Chem., vol. 19, 1980, p. 167–178.

* cited by examiner

Primary Examiner—William K. Cheung
(74) Attorney, Agent, or Firm—Keil & Weinkauf

(57) ABSTRACT

In a process for polymerizing ethylene and, if desired, further monomers in a high-pressure reactor at from 140 to 320° C. and pressures of from 1000 to 4000 bar, but in any case under pressure and temperature conditions under which water displays supercritical behavior, water is introduced continuously or intermittently into the reactor.

13 Claims, No Drawings

METHOD FOR HIGH PRESSURE POLYMERIZATION OF ETHYLENE IN THE PRESENCE OF SUPERCRITICAL WATER

The present invention relates to a process for polymerizing ethylene and, if desired, further monomers in a high-pressure reactor at from 140 to 320° C. and pressures of from 1000 to 4000 bar, but in any case under pressure and temperature conditions under which water displays supercritical behavior.

High-pressure polymerization processes for preparing polyethylene and ethylene copolymers have been known for a long time. Processes carried out in high-pressure tube reactors are particularly widespread. Such processes are described, for example, in EP-A-449092, EP-A-394794, EP-B-567818 and DE-A-4102808. The output of such high-pressure polymerization processes is restricted, inter alia, by the effectiveness of the removal of heat evolved in the exothermic polymerization reaction. The removal of the heat of polymerization in such tube reactors is limited, in particular, by a layer of deposited material building up on the inner surface of the tube due to the relatively slow flow velocity and hindering effective heat removal.

It is an object of the present invention to improve the removal of heat in high-pressure polymerizations of ethylene and in this way to increase the output of such processes.

We have found that this object is achieved by a process as described at the outset for polymerizing ethylene and, if desired, further monomers in which water is introduced continuously or intermittently into the reactor.

Homopolymers of ethylene and also copolymers of ethylene with further monomers can be prepared by the polymerization process of the present invention. Suitable comonomers are, for example, α, β-unsaturated carboxylic acids or derivatives of such carboxylic acids.

The α, β-unsaturated carboxylic acids which can be used as comonomers in the process of the present invention are generally short-chain carboxylic acids having from 3 to 8 carbon atoms. Examples which may be mentioned are acrylic acid, methacrylic acid, crotonic acid, maleic acid and fumaric acid, with acrylic acid and methacrylic acid being particularly preferred comonomers.

Apart from the free acids, it is also possible to use derivatives, in particular esters of $C_2$–$C_6$-alkanols, i.e. ethyl, propyl, butyl, pentyl or hexyl esters, as comonomers. A particularly advantageous comonomer is n-butyl acrylate.

A further comonomer which can be used particularly advantageously in the process of the present invention is vinyl acetate.

The comonomers are usually used in concentrations such that the proportion of comonomer in the copolymer is from 1 to 30% by weight. In the case of acrylate esters, the preferred proportion of comonomer in the ethylene copolymer is from 0.5 to 20% by weight, in particular from 1 to 10% by weight. The preferred proportion of vinyl acetate in copolymers containing vinyl acetate is from 1 to 30% by weight, in particular from 2 to 25% by weight.

The process of the present invention can be carried out in all customary high-pressure reactors. Since deposit formation is of particular significance in the case of high-pressure tube reactors because of the large reactor surface area of these reactors, the process of the present invention can be used particularly advantageously in high-pressure tube reactors.

For the purposes of the present invention, tube reactors are tubular polymerization vessels whose ratio of length to diameter of the pressure-rated tubes is generally in the range 10.000–60.000:1. In any case, these tubular reactors have a length to diameter ratio of >1000. Information on high-pressure ethylene polymerization processes in which tube reactors are employed may be found, for example, in "Ullmanns Enzyklopädie der technischen Chemie", 1980, 4$^{th}$ edition, volume 19, pp. 167–178, Verlag Chemie GmbH, 6940 Weinheim.

It is possible to use all known types of reactor, for example reactors with or without cold gas feed, reactors with pressurized water cooling, etc., as are known to those skilled in the art.

The process of the present invention is advantageously carried out at from 2000 to 3500 bar, in particular at from 2200 to 3500 bar. The preferred temperatures are in the range from 160 to 300° C. In the case of the copolymerization of ethylene with sensitive comonomers, in particular carboxylic esters, the polymerization is preferably carried out at below 220° C.

Preference is generally given to a process in which the polymerization temperature is no higher than 280° C.

In the process of the present invention, it is important that the pressure and temperature conditions are always selected so that water can be present in a supercritical state in at least the major part of the reactor volume. The supercritical data of water can easily be found in appropriate tables.

The water can be introduced continuously or intermittently into the reactor. In an advantageous embodiment of the process of the present invention, the water is introduced continuously into the reactor. Fluctuations in product quality are avoided by continuous introduction of small amounts of water.

The setting of the correct water concentration in the reactor is important for the success of the process of the present invention. Water concentrations which are too low do not have the desired effect of improved heat removal. Concentrations of the supercritical water which are too high lead, on the other hand, to an undesirable deterioration in the product quality. The optimum concentration of supercritical water in the reactor depends on the respective pressure and temperature conditions and on the reactor geometry and the flow velocity through the reactor. For this reason, the optimum concentration of supercritical water has to be determined in each case for the respective reactor and the desired polymerization conditions. However, this can easily be done by a person skilled in the art. The usual procedure is to introduce initially very small amounts of water into the reactor at constant polymerization parameters. The temperature difference between the interior space of the reactor and the outer surface of the pressure tube is then monitored by means of suitable temperature measurement devices and the concentration of supercritical water is increased until this temperature difference is minimized while still achieving the desired product quality.

In a preferred embodiment of the process of the present invention, the concentration of the water, based on the amount of ethylene, in the reactor is in a range from 0.0001 to 5% by weight. Relatively small amounts of water in particular display an optimal effect. In a preferred embodiment, therefore, from 0.0001 to 1% by weight of water, preferably from 1 to 5 000 ppm (by mass) of water and particularly preferably from 1 to 2 000 ppm of water, in each case based on the amount of ethylene, are fed in.

Furthermore, a particularly favorable process has been found to be one in which the temperature difference between the interior space and the outer surface of the pressure tube is measured and the amount of water introduced into the reactor is regulated as a function of the temperature difference measured in this way. The "outer surface" is generally the cooling water jacket of the reactor. As mentioned above, the objective is to achieve a very small temperature difference because this indicates only a slight layer of deposited material on the inner surface of the reactor. The point at which this temperature difference is measured depends on the mode of operation of the reactor. In the case of simple reactors in which the monomer stream is fed in at only one point at the inlet of the reactor, the reactor generally has a simple temperature profile so that one point for measuring the temperature difference can be sufficient. In the case of reactors in which initiator is injected at a plurality of points, and particularly in the case of reactors in which cold monomer gas is fed in at a plurality of points, it is advantageous to measure the temperature difference at a plurality of points on the reactor.

In the process of the present invention, the polymerization can be initiated by means of various initiators. Examples of suitable initiators are air, oxygen or peroxidic polymerization initiators. Initiation using peroxides represents a particularly preferred embodiment of the process of the present invention. Suitable peroxides are, in particular, ones which decompose into free radicals only at relatively high temperatures. Examples of suitable peroxidic polymerization initiators are 1,1-bis (t-butylperoxy) cyclohexane, 1,1-bis (t-butylperoxy) butane, t-butyl 3,5,5-trimethylperhexanoate, t-butyl perbenzoate, 2,5-bis (t-butylperoxy)-2,5-dimethylhexane, t-butyl cumyl peroxide, di-t-butyl peroxide and 2,5-bis (t-butyl-peroxy)-2,5-dimethyl-3-hexyne; particular preference is given to using di-t-butyl peroxide.

In a preferred embodiment of the process of the present invention, peroxidic polymerization initiators used are ones having a decomposition temperature of at least 150° C. Here, it is possible to use either individual peroxides or, preferably, mixtures of various peroxides.

A notable aspect of the process of the present invention is that supercritical water itself can act as initiator and the concentration of the other initiators can therefore generally be reduced. This effect is particularly desirable since the initiators represent an important cost factor in the high-pressure polymerization of ethylene.

As mentioned above, the process of the present invention can be employed in reactors having single-point monomer feed and also in reactors having multiple cold gas feed. In an advantageous embodiment of the process, the ethylene and, if used, further monomers are fed into the reactor at a plurality of different points on the tubular reactor.

The water can either be introduced only at the inlet of the reactor or at various points along the reactor. Thus, for example, the water can be fed in together with the monomers or else be introduced at the points at which initiator is injected into the reactor.

EXAMPLES AND COMPARATIVE EXPERIMENTS

Examples 1 to 4 and comparative experiment 1 (C1) were carried out in a tubular reactor having a length of 450 m and a length:diameter ratio of 29 300. Propionaldehyde was admixed with water so that the amount of water indicated in table 1 and the amount of propionaldehyde required as molar mass regulator to achieve the desired melt flow index of 0.3 g/10 min were employed. As free-radical initiator, use was made of a peroxide mixture containing up to three organic peroxides (decomposing as low, intermediate and high temperatures) which was fed directly to the feed points of the tube reactor by means of high-pressure piston pumps.

The reaction zones were each divided into two separate, cooled zones. The water inlet temperature in each reaction zone was 170° C. The reactor is divided into three reaction zones having lengths of 170 m (reaction zone 1), 170 m (reaction zone 2) and 110 m (reaction zone 3). The oxygen-free ethylene (3.6 t/h) was compressed in a plurality of stages to the reaction pressure of 3 000 bar and fed together with the propionaldehyde/water mixture into the first reaction zone of the tube reactor.

The heat of reaction liberated in the polymerization was removed from the reaction mixture via a coolant circuit. The resulting polymer was separated in a customary and known manner from unreacted ethylene and other low molecular weight compounds in the separators intalled downstream of the reactor.

The water content was checked by measuring the index of refraction (refractometry) using a calibration line. For relatively small amounts of water (less than 0.15% by weight of water based on the molar mass regulator), determination of the water content by the Karl-Fischer method (oximetric titration) is particularly suitable.

A product having a density (measured in accordance with ISO 1183) of from 0.9265 to 0.927 g/cm$^3$ and a melt flow index MFI (190° C./2.16) (measured in accordance with ISO 1133) of 0.3 g/10 min was obtained in each case.

Example 5 and comparative example 2 (C2) were carried out in a tubular reactor having a length of 540 m and a length:diameter ratio of 30 500. Propane was used as molar mass regulator. Air was used as free-radical initiator and was introduced into the ethylene in the compressor region. The reactor is divided into two reaction zones each having the same length. The reaction zones are each divided into two separate cooled zones. The water inlet temperature in each reaction zone was 178° C. The fresh ethylene (3.6 t/h) is divided into two streams (in the ratio 2:1) downstream of the after-compressor and fed to various points on the reactor, in each case at the beginning of the reaction zone (2 parts into reaction zone 1 and 1 part into reaction zone 2). Water was introduced into the ethylene shortly before the inlet points to the reaction zone 1 of the tube reactor, in the preheater.

The heat of reaction liberated in the polymerization was removed from the reaction mixture via a coolant circuit. The resulting polymer was separated in a customary and known manner from unreacted ethylene and other low molecular weight compounds in the separators intalled downstream of the reactor.

A product having a density (measured in accordance with ISO 1183) of from 0.9265 to 0.927 g/cm$^3$ and a melt flow index MFI (190° C./2.16) (measured in accordance with ISO 1133) of 0.3 g/10 min was obtained in each case.

ABBREVIATIONS:

T RZ1in is the gas temperature at the beginning of the reaction zone 1

T RZ1max is the maximum gas temperature in reaction zone 1

T RZ2in is the gas temperature at the beginning of the reaction zone 2

T RZ2max is the maximum gas temperature in reaction zone 2

T RZ3in is the gas temperature at the beginning of the reaction zone 3

T RZ3max is the maximum gas temperature in reaction zone 3

T RZ1out is the gas temperature at the end of the reaction zone 1

TABLE 1

Polymerization data

| Ex. | Amount of water metered in in ml/h | Amount of water metered in in ppm | T RZ1in in °C. | T RZ1max in °C. | T RZ2in in °C. | T RZ2max in °C. | T RZ3in in °C. | T RZ3max in °C. | Production in kg/h |
|---|---|---|---|---|---|---|---|---|---|
| 1 | 30 | 8 | 167 | 273 | 215 | 284 | 219 | 284 | 885 |
| 2 | 55 | 15 | 165 | 272 | 209 | 283 | 215 | 283 | 925 |
| 3 | 90 | 25 | 164 | 273 | 210 | 282 | 216 | 282 | 910 |
| 4 | 1090 | 305 | 164 | 270 | 212 | 283 | 218 | 281 | 875 |
| C1 | — | — | 166 | 274 | 225 | 285 | 226 | 285 | 825 |

TABLE 2

Polymerization data

| Ex. | Amount of water metered in in ml/h | Amount of water metered in in ppm | T RZ1in in °C. | T RZ1max in °C. | T RZ1out in °C. | T RZ2in in °C. | T RZ2max in °C. | Production in kg/h |
|---|---|---|---|---|---|---|---|---|
| C2 | — | — | 187 | 280 | 235 | 178 | 271 | 770 |
| 5 | 1200 | 330 | 186 | 282 | 224 | 172 | 281 | 840 |

We claim:

1. A process for homo polymerizing ethylene in a high-pressure reactor at from 140 to 320° C. and pressures of from 1000 to 4000 bar, but in any case under pressure and temperature conditions under which water displays super-critical behavior, wherein water added in the range from 0.0001 to 1% by weight of the ethylene in the reactors is introduced continuously or intermittently into the reactor.

2. A process as claimed in claim 1, wherein the polymerization is carried out in a tubular reactor having a length to diameter ratio of >1000.

3. A process as claimed in claim 1, wherein the water is introduced continuously into the reactor.

4. A process as claimed in claim 1, wherein the temperature difference between the interior space and the outer surface of the pressure tube is measured and the amount of water introduced into the reactor is regulated as a function of the temperature difference measured in this way.

5. A process as claimed in claim 1, wherein the polymerization is initiated by means of peroxides.

6. A process as claimed in claim 1, wherein the ethylene is fed into the reactor at a plurality of different points on the tubular reactor.

7. A process as claimed in claim 1, wherein the pressure in the reactor is from 2200 to 3500 bar.

8. A process as claimed in claim 1, wherein the polymerization temperature is no higher than 280° C.

9. The process of claim 1 wherein the water is in the range of 1 to 5000 ppm based on the weight of ethylene in the reactor.

10. The process of claim 9 wherein the water is the range of 1 to 2000 ppm.

11. The process of claim 2, wherein the polymerization temperature is 160 to 300° C., the pressure is 2200 to 3500 bars and the water is the range of ethylene in the reactor.

12. The process of claim 11 wherein the water is in the range of about 30 to about 330 ppm.

13. The process of claim 12 wherein the temperature is in the rang of about 164 to about 284° C.

* * * * *